United States Patent [19]

Rosch et al.

[11] Patent Number: 4,764,956
[45] Date of Patent: Aug. 16, 1988

[54] ACTIVE IMPEDANCE LINE FEED CIRCUIT

[75] Inventors: Reinhard Rosch, Richmond; Stanley D. Rosenbaum, Ottawa; Calvin Plett, Ottawa; Zdenek Holy, Nepean, all of Canada

[73] Assignee: Northern Telecom Limited, Montreal, Canada

[21] Appl. No.: 68,686

[22] Filed: Jul. 1, 1987

[30] Foreign Application Priority Data

Dec. 24, 1986 [CA] Canada .................................. 526332

[51] Int. Cl.$^4$ ...................... H04M 1/76; H04M 19/00
[52] U.S. Cl. .................................. 379/413; 379/412; 379/347
[58] Field of Search ...................... 379/22, 26, 27, 30, 379/350, 351, 377, 378, 379, 380, 385, 398, 399, 400, 402, 405, 412, 413, 324, 322, 345, 347

[56] References Cited

U.S. PATENT DOCUMENTS

| 4,476,350 | 10/1984 | Aull et al. ........................ 379/413 X |
| 4,540,854 | 9/1985 | Beirne .............................. 379/377 X |
| 4,571,460 | 2/1986 | Rosenbaum et al. ............ 379/412 X |

FOREIGN PATENT DOCUMENTS 0169706 1/1986 European Pat. Off. ............ 379/413

Primary Examiner—Jin F. Ng
Assistant Examiner—Randall S. Vaas
Attorney, Agent, or Firm—J. E. Moorhouse

[57] ABSTRACT

A typical active impedance line feed circuit includes tip and ring amplifiers being controlled in response to signals at tip and ring voltage taps by control circuit to exhibit a.c. impedance and d.c. resistance characteristics for the purpose of supplying energizing current via tip and ring terminals for tip and ring leads of a two wire communication line. In one example of the active impedance line feed circuit, improved operational tolerance of longitudinal interference and of a ground fault condition is provided by a d.c. amplifier being responsive to voltages at the tip and ring terminals. The circuit is characterized in that an inverting input of the d.c. amplifier is connected via resistors to the tip and ring voltage taps. In operation, the d.c. amplifier provides complete cancellation of all common mode signals at the tip and ring voltage taps and a compensation circuit is also connected between the tip and ring voltage taps and is responsive to the output of the control circuit for compensating for non-symmetrical current, the non-symmetrical current being introduced between the tip and ring voltage taps by normal operation of the control circuit, thereby a threshold of ground fault current limiting action is substantially constant under all operating conditions. The d.c. amplifier is conveniently manufacturable in integrated circuit technology along with the remaining amplifiers in the active impedance line feed circuit.

4 Claims, 3 Drawing Sheets

ACTIVE IMPEDANCE LINE FEED CIRCUIT

The present invention is in the field of line circuits for telephone systems and more particularly concerns active impedance line feed circuits, as for example disclosed in any of U.S. Pat. Nos. 4,484,032 "Active Impedance Transformer Assisted Line Feed Circuit", 4,514,595 "Active Impedance Line Feed Circuit", 4,539,438 "Active Impedance Transformer Assisted Line Feed Circuit with Supervision Filtering", and 4,571,460 "Active Impedance Line Feed Circuit with Improved Ground Fault Protection".

BACKGROUND OF THE INVENTION

A typical active impedance line feed circuit includes tip and ring amplifier circuits being controlled to exhibit predetermined a.c. impedance and d.c. resistance characteristics for the purpose of supplying energizing current for a two wire communication line via tip and ring terminals. The active impedance line feed circuit is connected to the tip and ring terminals and to tip and ring voltage taps via tip and ring feed resistors and tip and ring voltage dividers which are usually provided in the form of a film resistor network residing on an electrically insulating substrate. The line feed circuit disclosed in the U.S. Pat. No. 4,571,460 includes a d.c. amplifier having an input directly connected to the tip and ring terminals by a pair of matched resistors. An output of the d.c. amplifier is resistively connected to tip and ring voltage taps and also coupled via a unidirectional resistive current path to an input of the ring amplifier circuit.

In operation, the d.c. amplifier reduces fault current and associated circuit heating in a case of a low resistive fault connection from the ring lead of the two wire communication line to ground. This condition is usually referred to as a ground fault. Also in normal operation, the d.c. amplifier reduces dependance upon desirably high common mode rejection characteristics of a differential input of a control circuit such that a satisfactory integrated circuit embodiment of the line feed circuit is more readily manufacturable.

As shown in the patent and in FIG. 1, labeled Prior Art, the d.c. amplifier is controlled by potentials appearing on the two wire communication line via the resistors connected to its inverting input. Hence these resistors are preferably of very high resistance values in order to help protect the d.c. amplifier from any extraordinary potentials which might appear on the two wire communication line. Furthermore, the required high ohmic values of the matched resistors make it inconvenient if not virtually impossible to include these elements in an integrated circuit. Another disadvantage of the prior art is that the reduction of dependence on common mode rejection in the control circuit can be optimized for operation during one of a balanced talking condition or an unbalanced ringing condition, but not both, by a choice of resistance values.

It is an object of the invention to provide an active impedance line feed circuit having operating characteristics similar to those of an active impedance line feed circuit as disclosed in U.S. Pat. No. 4,571,460 but in a more economically manufacturable circuit configuration and providing improved cancellation of common mode signals at the tip and ring voltage taps.

SUMMARY OF THE INVENTION

An active impedance line feed circuit in accordance with the invention includes tip and ring amplifiers being responsive to a control signal, which is proportional to currents in tip and ring feed resistors, for supplying direct energizing current and a.c. information signals to a two wire communication line via tip and ring terminals connected to outputs of the tip and ring amplifiers by the tip and ring feed resistors respectively. Tip and ring voltage dividers are connected in combination with the tip and ring feed resistors and include tip and ring voltage taps. A control circuit for generating the control signal includes a differential input connected across the tip and ring voltage taps. A d.c. amplifier is responsive to signals at the tip and ring terminals for attenuating longitudinal signals at the tip and ring voltage taps and for reducing fault current conduction during an occurrence of a ground fault condition on the two wire communication line. The active impedance line feed circuit is characterized in that an inverting input of the d.c. amplifier is connected to the tip and ring voltage taps by a first pair of resistive elements being of similar ohmic values and an output of the d.c. amplifier is connected to the tip and ring voltage taps by a second pair of resistive elements being of similar ohmic values. In operation the d.c. amplifier is subjected to attenuated electrical potential as with respect to potentials at the tip and ring terminals. Hence the d.c. amplifier is conveniently manufacturable in integrated circuit technology along with the remaining amplifiers in the active impedance line feed circuit.

The active impedance line feed circuit is further characterized in that a compensation circuit is connected between the tip and ring voltage taps and is responsive to the output of the control amplifier for compensating for non-symmetrical current, as is normally introduced between the tip and ring voltage taps by operation of the control circuit, whereby a threshold of ground fault current limiting action by the d.c. amplifier is substantially unaffected by variations in differential signals appearing at the tip and ring voltage taps and whereby a common mode rejection operational requirement of the control circuit is relaxed.

BRIEF DESCRIPTION OF THE DRAWINGS

Example embodiments of an active impedance line feed circuit are discussed with reference to the accompanying drawings in which.

DESCRIPTION OF THE EXAMPLE EMBODIMENT

Figure 2:
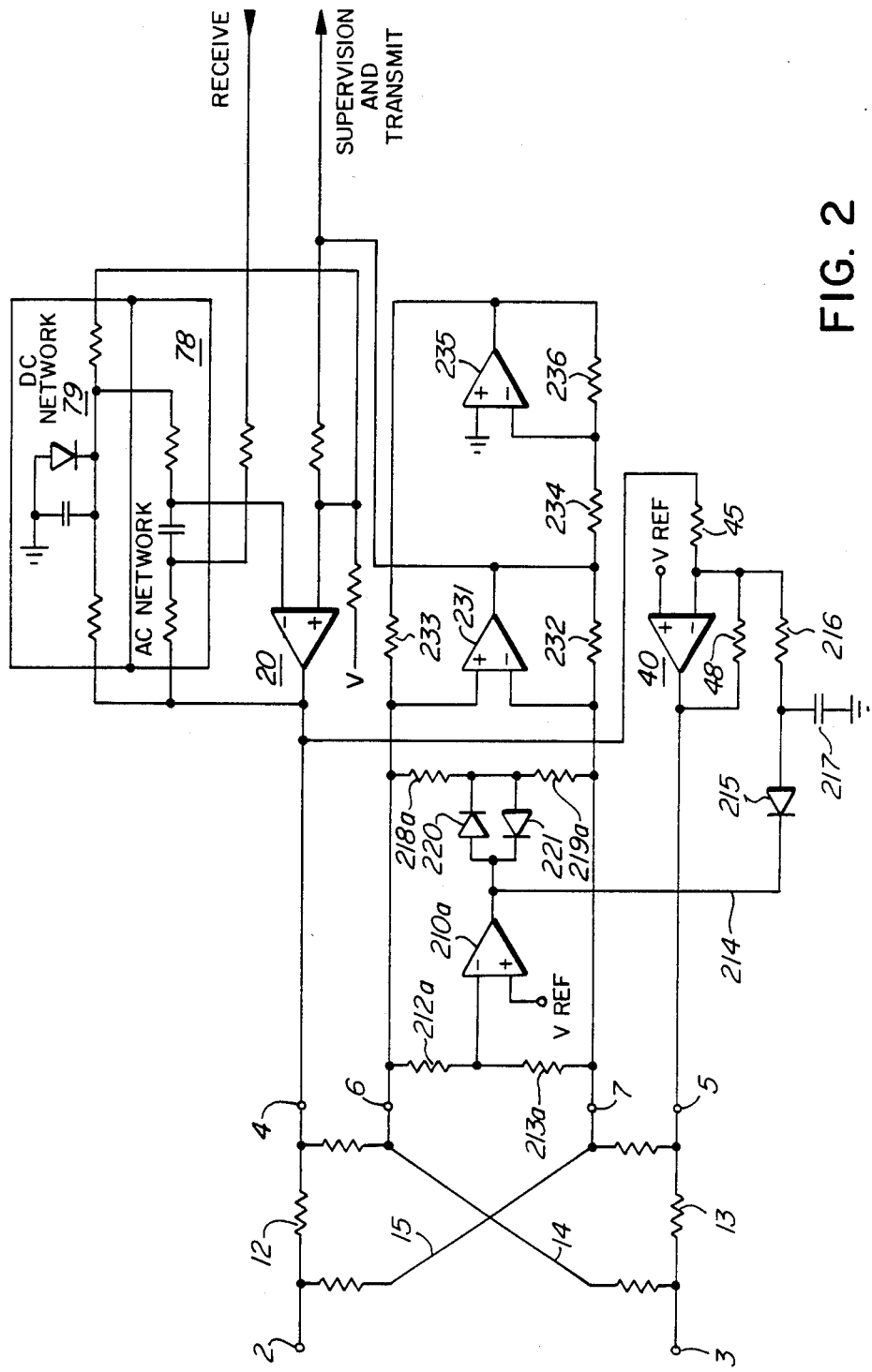
FIG. 2 is a schematic diagram of one example of an active impedance line feed circuit in accordance with the invention.
Figure 3:
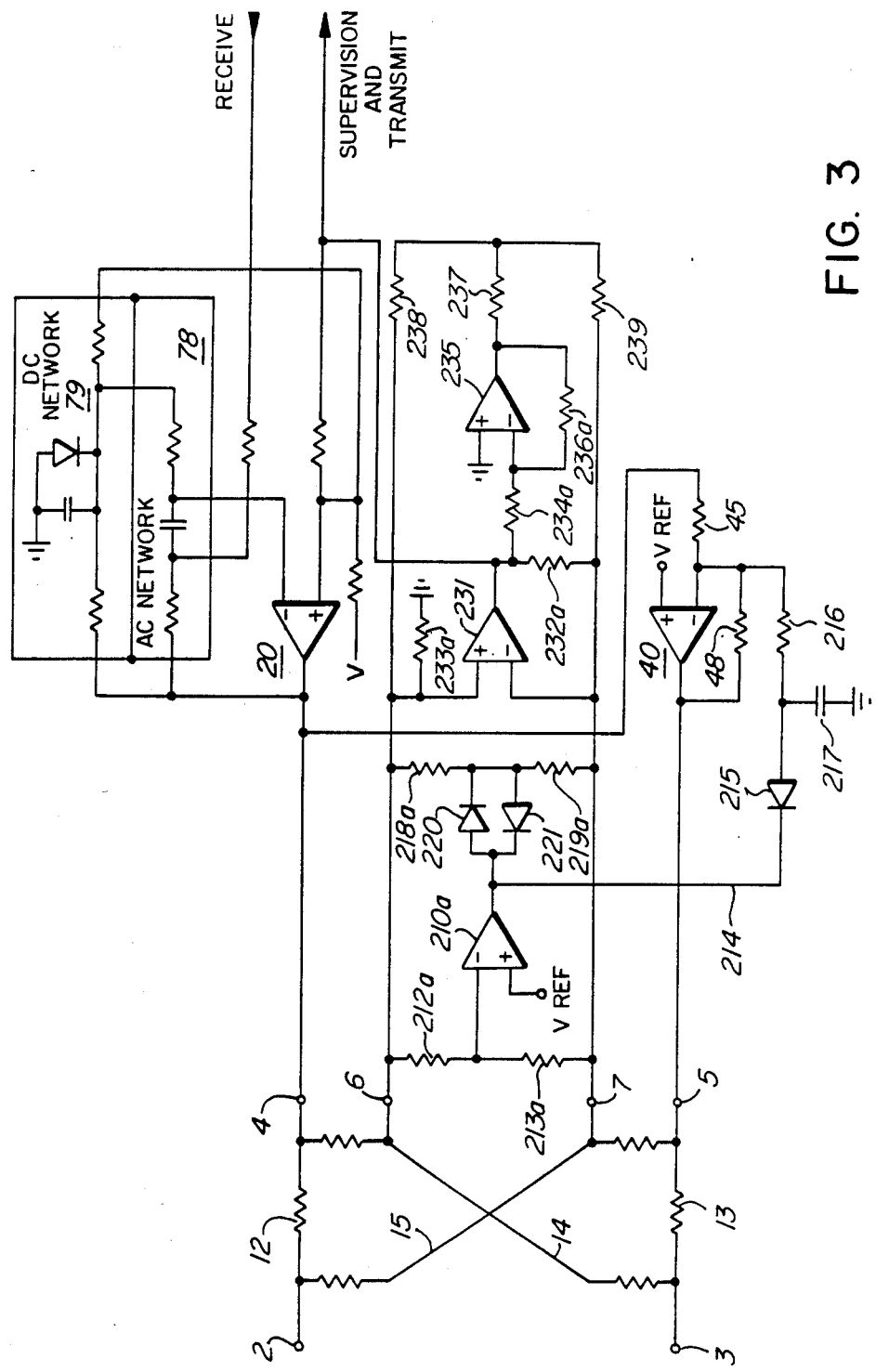
FIG. 3 is a schematic diagram of another example of an active impedance line feed circuit in accordance with the invention.

Many aspects of the active impedance line feed circuit in FIGS. 2 and 3 are similar to examples of line feed circuits described in the previously mentioned patents. Therefore many of the circuit elements are labelled similarly. However circuit elements not introduced in any of the previous patents are labelled distinctly therefrom.

In each of FIGS. 2 and 3, a tip feed resistor 12 is connected in series with a tip terminal 2 and an output terminal 4 of a tip amplifier circuit 20. A ring feed resistor 13, of ohmic value similar to that of the tip feed resistor 12, is connected in series with a ring terminal 3 and an output terminal 5 of a ring amplifier circuit 40. The tip and ring amplifier circuits 20 and 40 are typically powered from a battery in a telephone system, not shown, common to a plurality of line circuits. A tip voltage divider 14 includes a tip voltage tap 6 and is connected in series between the terminals 4 and 3. A ring voltage divider 15 includes a ring voltage tap 7 and is connected in series between the terminals 2 and 5. A control circuit at 60 includes a differential input of an amplifier 231, connected across the voltage taps 6 and 7, as shown. An output of the control circuit at 60 is connected to a supervision and transmit lead for providing a.c. information signals and supervisory signals to the associated telephone system. The output of the control circuit 60 is also resistively connected to a non-inverting input of the tip amplifier circuit 20, as is a bias voltage source V.

Resistors 45 and 48 are connected in series between the outputs of the tip and ring amplifier circuits 20 and 40, and a junction of the resistors 45 and 48 is connected to an inverting input of the ring amplifier circuit 40. It is usual that ohmic values for the resistors 45 and 48 be similar so that the ring amplifier circuit 40 will operate as an inverse follower with a gain of one with respect to signals at the terminal 4. Operating a.c. impedance and d.c. resistance characteristics of the outputs of the tip and ring amplifier circuits are therefore similar and are determined primarily by a.c. and d.c. networks 78 and 79 connected as shown between the output and the inverting input of the tip amplifier circuit 20.

Circuit elements identified with labels in a range of 210–219 in combination with the active impedance line feed circuit as thus far described, provide for improved ground fault protection and common mode rejection.

In more detail, a differential amplifier circuit, hereafter referred to as a d.c. amplifier 210a includes an output being resistively coupled via resistors 218a and 219a and diodes 220 and 221 to the tip and ring voltage taps 6 and 7 respectively. The output is also connected to the inverting input of the ring amplifier circuit 40 via a unidirectional resistance current path 214 which includes a diode 215 connected in series with a resistor 216 as shown. In this example, a capacitor 217 is connected between ground and a junction of the resistor 216 and the diode 215. An inverting input of the amplifier 210a is connected to the tip and ring voltage taps 6 and 7 by a first pair of resistive elements 212a and 213a being of similar ohmic values. An output of the d.c. amplifier 210a is connected to the tip and ring voltage taps via a pair of diodes 220 and 221 arranged in parallel back to back configuration and a second pair of resistive elements 218a and 219a being of similar ohmic values. The control circuit at 60 includes a control amplifier circuit and a compensating amplifier circuit. The control amplifier circuit includes a differential amplifier 231 and the compensating amplifier circuit includes a differential amplifier 235.

Figure 1:
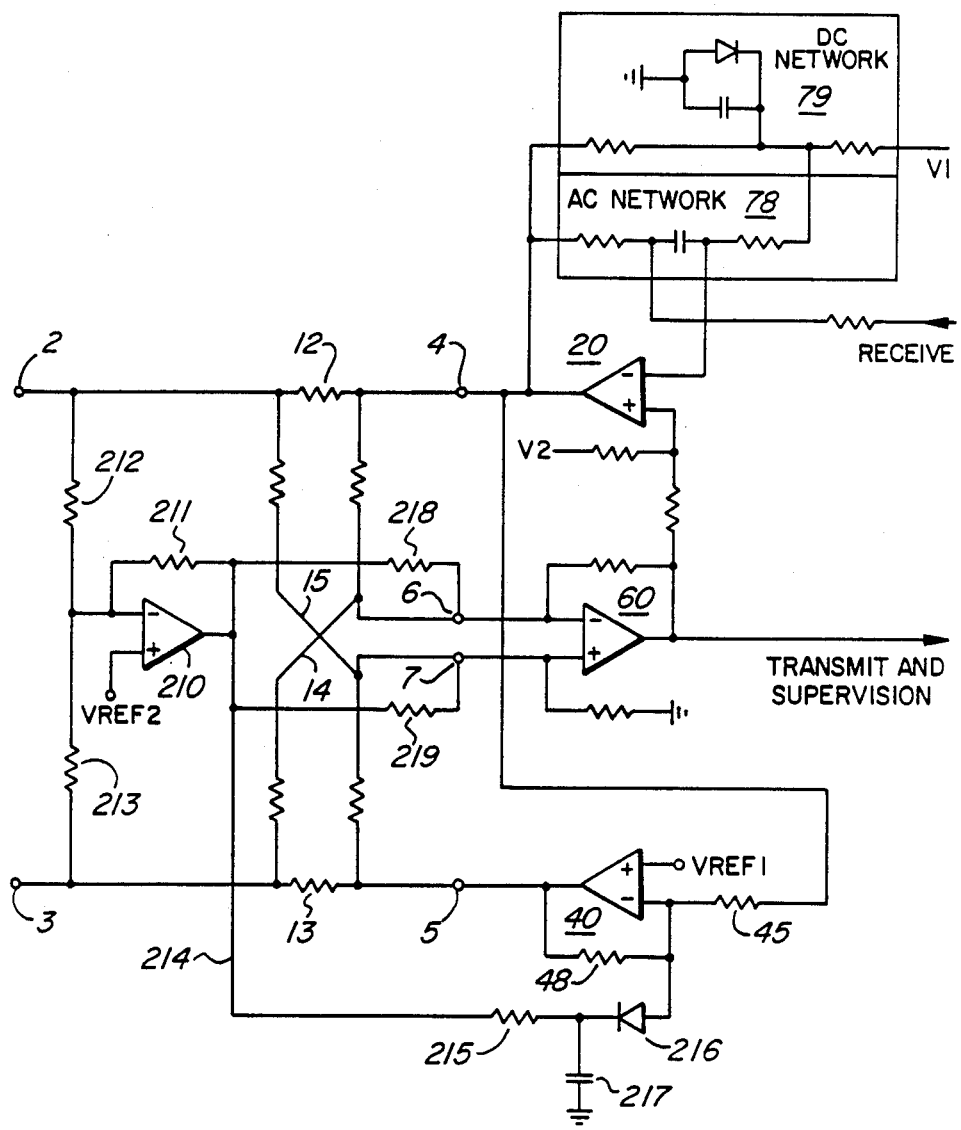
FIG. 1 is a schematic diagram of a prior art line feed circuit which was discussed in the foregoing.

Operation of the circuit in FIG. 2 is basically the same as that of the prior art circuit in FIG. 1, except that the input signal for the d.c. amplifier 210a is taken from across the tip and ring voltage taps 6 and 7 instead of directly from the tip and ring terminals 2 and 3. The d.c. amplifier 210a responds to any common mode signals appearing at the tip and ring terminals by virtually cancelling these signals at the tip and ring voltage taps 6 and 7 via the resistors 218a and 219a. The resistors 218a and 219a also act as feedback resistors for the d.c. amplifier 210a.

Since the resistive elements 212a, 213a, 218a and 219a are thus shielded from extraordinary voltages as might appear on the two wire communication line, these resistive elements may be stipulated to have values convenient for either thick film technology or integrated silicon technology as desired. Although the resistive elements 212a and 213a should be of equal ohmic values, their actual values are not critical as these elements do not normally carry significant current. A minor advantage, over the circuit shown in FIG. 1, is derived from the fact that the resistors 212a and 213a are not connected directly across the tip and ring terminals 2 and 3, and hence ON HOOK quiescent current consumption by the line circuit is slightly reduced. In a typical central office equipped with line circuits as in FIG. 2 in contrast to line circuits as in FIG. 1, a measurable reduction in power consumption is achieved. Another advantage is derived from the circuit arrangement in FIG. 2 in that the d.c. amplifier is normally integrated with the rest of the line feed circuit. Therefore the pin out requirement for the resulting integrated circuit is reduced with consequent cost saving.

The control amplifier 231 in FIG. 2 is connected with resistors 232 and 233 in such a configuration that feedback from the output of the amplifier 231 is via the resistor 232. This is of non-symmetrical arrangement which is preferably compensated to avoid an adverse loading effect across the tip and ring voltage taps 6 and 7. A compensating amplifier 235 is provided, connected as shown with resistors 234 and 236. In operation, output of the compensating amplifier 235 is phase inverted with respect to the output of the control amplifier 231, to provide the required symmetry via the resistor 233 at the tip voltage tap 6. The compensating action causes the tip and ring voltage taps 6 and 7 to remain at a constant potential, and hence precludes the d.c. amplifier 210a from responding to differential signals which would otherwise appear in response to non-symmetrical feedback to the tip and ring voltage taps 6 and 7.

The embodiment shown in FIG. 3 provides an alternate arrangement of the control amplifier 231 and the compensating amplifier 235. The control amplifier 231 is connected with resistors 233a and 232a such that in operation, non-symmetrical feedback current conducted by the resistor 232a to the ring voltage tap 7 is compensated. The compensating amplifier 235 in this embodiment is connected with resistors 234a and 236a to provide a phase inverted replica of the output of the control amplifier 231. This generates compensating currents, via the resistor 237, through both of resistors 238 and 239.

What is claimed is:

1. An active impedance line feed circuit including tip and ring amplifiers being responsive to a control signal being proportional to currents in tip and ring feed resistors for supplying energizing current and a.c. information signals to a two wire communication line via tip and ring terminals connected to outputs of the tip and ring amplifiers by the tip and ring feed resistors respectively, tip and ring voltage dividers including tip and ring voltage taps respectively, a control circuit including a control amplifier for generating the control signal, the control amplifier having a differential input connected across the tip and ring voltage taps, and a d.c. amplifier being responsive to signals at the tip and ring terminals for attenuating longitudinal signals at the tip and ring voltage taps and for reducing fault current conduction during an occurrence of a ground fault condition on the two wire communication line, the active impedance line feed circuit being characterized in that:

an inverting input of the d.c. amplifier is connected to the tip and ring voltage taps by a first pair of resistive elements being of similar ohmic values, and an output of the d.c. amplifier is also connected to the tip and ring voltage taps by a second pair of resistive elements being of similar ohmic values, whereby in operation the d.c. amplifier is subjected to attenuated electrical potential as compared with potentials at the tip and ring terminals, whereby the d.c. amplifier is conveniently manufacturable in integrated circuit technology along with the other amplifiers in the active impedance line feed circuit.

2. An active impedance line feed circuit as defined in claim 1 further characterized by a compensation circuit being connected between the tip and ring voltage taps and being responsive to the output of the control amplifier for compensating for a non-symmetrical current, said non-symmetrical current being introduced between the tip and ring voltage taps by normal operation of the control circuit, whereby a threshold of ground fault current limiting action controlled by the d.c. amplifier is substantially unaffected by variations in differential signals appearing at the tip and ring voltage taps.

3. An active impedance line feed circuit as defined in claim 2, wherein the output of the control amplifier is resistively connected to the ring voltage tap, the compensation circuit comprising:

a first amplifier having an inverting input connected to a junction between first and second resistive elements being connected in series between the output of the control amplifier and an output of the first amplifier, the output of the first amplifier being connected to the tip voltage tap by a third resistive element.

4. An active impedance line feed circuit as defined in claim 2 wherein the output of the control amplifier is resistively connected to the ring voltage tap, the compensation circuit comprising:

a first amplifier having an inverting input connected to a junction of first and second resistive elements being connected in series between the output of the control amplifier and an output of the first amplifier, third and fourth resistive elements being connected between the tip and ring voltage taps, and a fifth resistive element being connected in series between the output of the first amplifier and a junction of the third and fourth resistive elements.

* * * * *